US010519685B2

(12) United States Patent
Viselli et al.

(10) Patent No.: US 10,519,685 B2
(45) Date of Patent: Dec. 31, 2019

(54) HYBRID CONCRETE-COMPOSITE TOWER FOR A WIND TURBINE AND METHOD OF MANUFACTURING

(71) Applicant: University of Maine System Board of Trustees, Orono, ME (US)

(72) Inventors: Anthony M. Viselli, Bangor, ME (US); Habib J. Dagher, Veazie, ME (US)

(73) Assignee: University of Maine System Board of Trustees, Orono, ME (US)

( * ) Notice: Subject to any disclaimer, the term of this patent is extended or adjusted under 35 U.S.C. 154(b) by 619 days.

(21) Appl. No.: 15/122,018

(22) PCT Filed: Mar. 2, 2015

(86) PCT No.: PCT/US2015/018256
§ 371 (c)(1),
(2) Date: Aug. 26, 2016

(87) PCT Pub. No.: WO2015/131174
PCT Pub. Date: Sep. 3, 2015

(65) Prior Publication Data
US 2019/0136566 A1 May 9, 2019

Related U.S. Application Data

(60) Provisional application No. 61/945,942, filed on Feb. 28, 2014.

(51) Int. Cl.
*E04H 12/16* (2006.01)
*F03D 13/20* (2016.01)
(Continued)

(52) U.S. Cl.
CPC .............. *E04H 12/16* (2013.01); *E04C 5/08* (2013.01); *E04H 12/02* (2013.01); *E04H 12/12* (2013.01);
(Continued)

(58) Field of Classification Search
CPC ....... E04H 12/12; E04H 12/16; E04H 12/341; E04H 12/342; F03D 13/20; E04C 3/34
See application file for complete search history.

(56) References Cited

U.S. PATENT DOCUMENTS

| 4,166,347 A | 9/1979 | Pohlman et al. |
| 5,858,493 A | 1/1999 | Sandt |

(Continued)

FOREIGN PATENT DOCUMENTS

| CA | 2722849 A1 * | 6/2011 | ............. E04H 12/16 |
| CN | 100570108 C | 12/2009 | |

(Continued)

OTHER PUBLICATIONS

Extended European Search Report, Application No. 15755461.9, dated Oct. 2, 2017.

(Continued)

*Primary Examiner* — Christine T Cajilig
(74) *Attorney, Agent, or Firm* — MacMillan, Sobanski & Todd, LLC

(57) ABSTRACT

A wind turbine tower includes a plurality of tower sections axially aligned and connected together. Each tower section includes an inner wall having a tapered cylindrical shape concentrically positioned within an outer wall having a tapered cylindrical shape. An annular space is defined between the inner wall and the outer wall, and a layer of concrete is disposed within the annular space. A plurality of post-tensioning cables extend longitudinally within the annular space or outside the outer wall, such that a first one of the tower sections is connected to a second one of the tower sections by a plurality of the post-tensioning cables.

18 Claims, 8 Drawing Sheets

(51) Int. Cl.
 *E04H 12/34* (2006.01)
 *E04H 12/12* (2006.01)
 *E04H 12/02* (2006.01)
 *E04H 12/08* (2006.01)
 *E04C 5/08* (2006.01)

(52) U.S. Cl.
 CPC ......... *E04H 12/341* (2013.01); *F03D 13/20* (2016.05); *E04H 12/08* (2013.01); *E04H 12/342* (2013.01); *F05B 2240/912* (2013.01); *Y02E 10/728* (2013.01)

(56) References Cited

U.S. PATENT DOCUMENTS

| | | | |
|---|---|---|---|
| 6,123,485 A * | 9/2000 | Mirmiran | E02D 31/02 |
| | | | 405/232 |
| 7,770,343 B2 | 8/2010 | Montaner Fraguet et al. | |
| 7,805,895 B2 | 10/2010 | Kristensen | |
| 8,484,905 B2 | 7/2013 | Skjaerbaek et al. | |
| 8,888,414 B2 * | 11/2014 | Hall | E02D 5/48 |
| | | | 405/216 |
| 9,021,757 B2 | 5/2015 | Hangel | |
| 9,062,662 B1 * | 6/2015 | Johnson | E04H 12/342 |
| 9,267,286 B2 * | 2/2016 | Kim | E04C 3/34 |
| 9,768,603 B2 | 9/2017 | Jensen et al. | |
| 2003/0183594 A1 * | 10/2003 | Torres Martinez | B66C 23/207 |
| | | | 212/196 |
| 2009/0266004 A1 * | 10/2009 | Willey | B29C 70/086 |
| | | | 52/40 |
| 2010/0154321 A1 * | 6/2010 | Javierre Lardies | E04C 3/34 |
| | | | 52/82 |
| 2011/0138704 A1 | 6/2011 | Bagepalli et al. | |
| 2011/0138731 A1 * | 6/2011 | Yoshimura | E04H 12/08 |
| | | | 52/651.01 |
| 2011/0239564 A1 | 10/2011 | Zheng et al. | |
| 2013/0001954 A1 * | 1/2013 | Garc a Maestre | F03D 13/22 |
| | | | 290/55 |
| 2014/0033628 A1 | 2/2014 | Lockwood et al. | |
| 2018/0305938 A1 * | 10/2018 | Rico Arenal | E04G 11/22 |

FOREIGN PATENT DOCUMENTS

| | | |
|---|---|---|
| CN | 101813069 A | 8/2010 |
| CN | 102099538 A | 6/2011 |
| CN | 102474089 A | 5/2012 |
| CN | 102734082 A | 10/2012 |
| CN | 102834572 A | 12/2012 |
| EP | 1876316 A1 | 1/2008 |
| EP | 2199469 A1 | 6/2010 |
| EP | 2253782 A1 | 11/2010 |

OTHER PUBLICATIONS

Chinese First Office Action, Application No. CN201580019384.4, dated Jun. 20, 2018.
PCT International Search Report and Written Opinion, Application No. PCT/US2015/018256, dated Jun. 8, 2015.

* cited by examiner

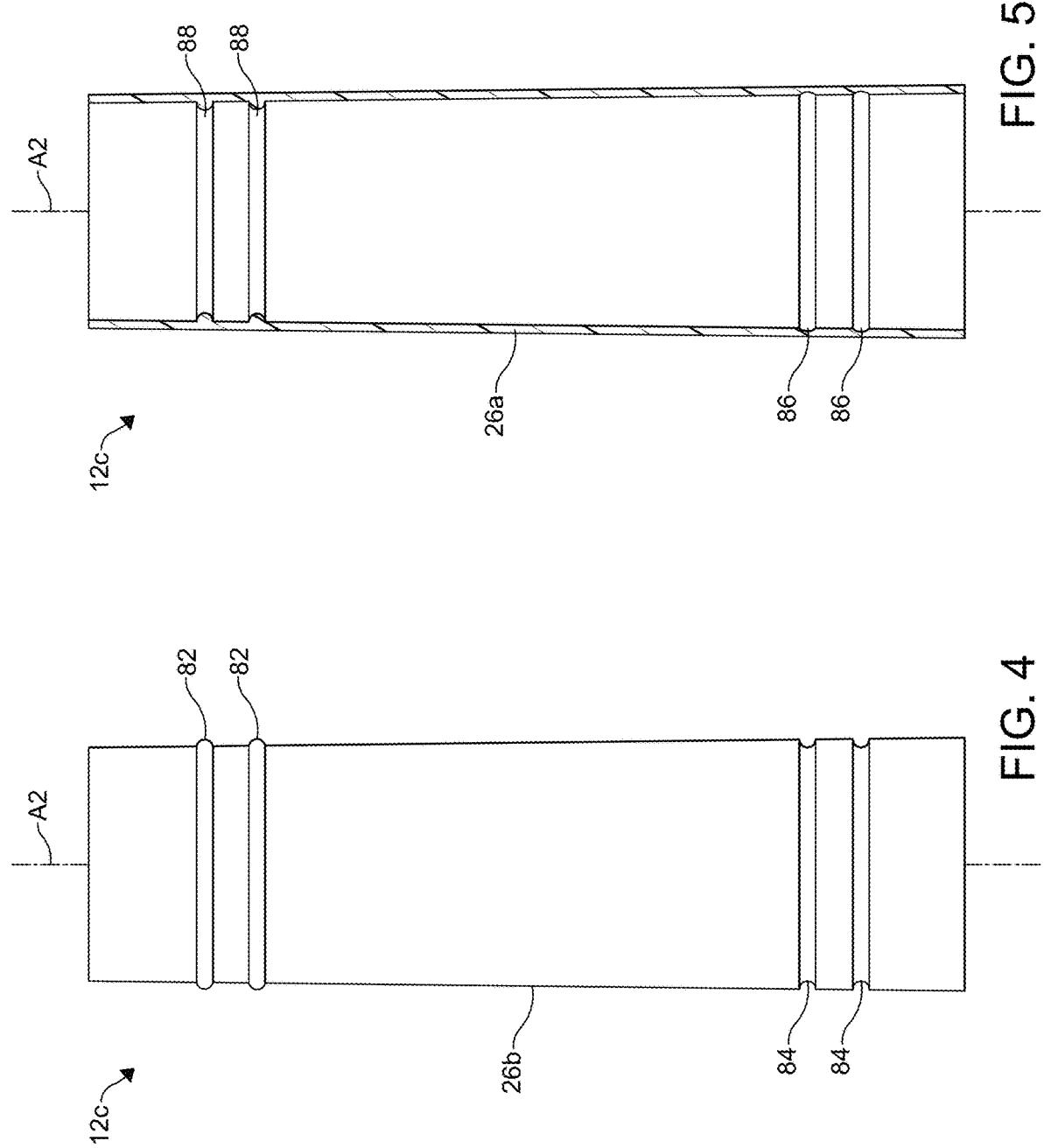

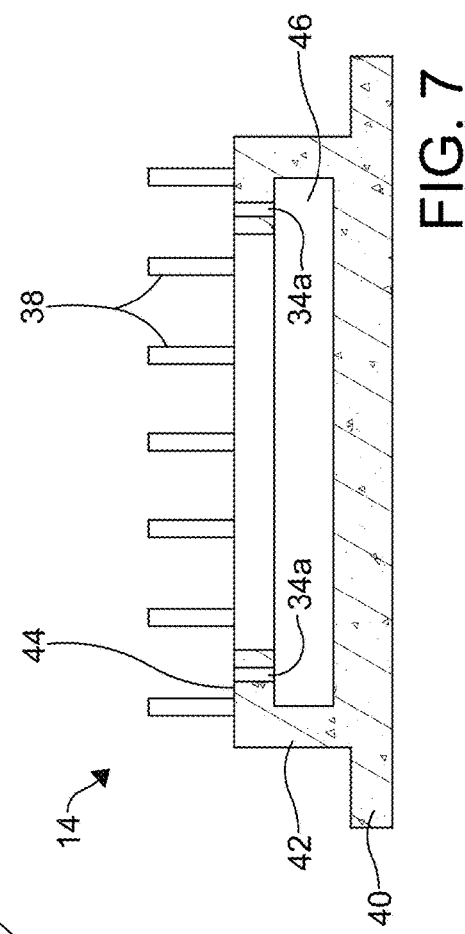
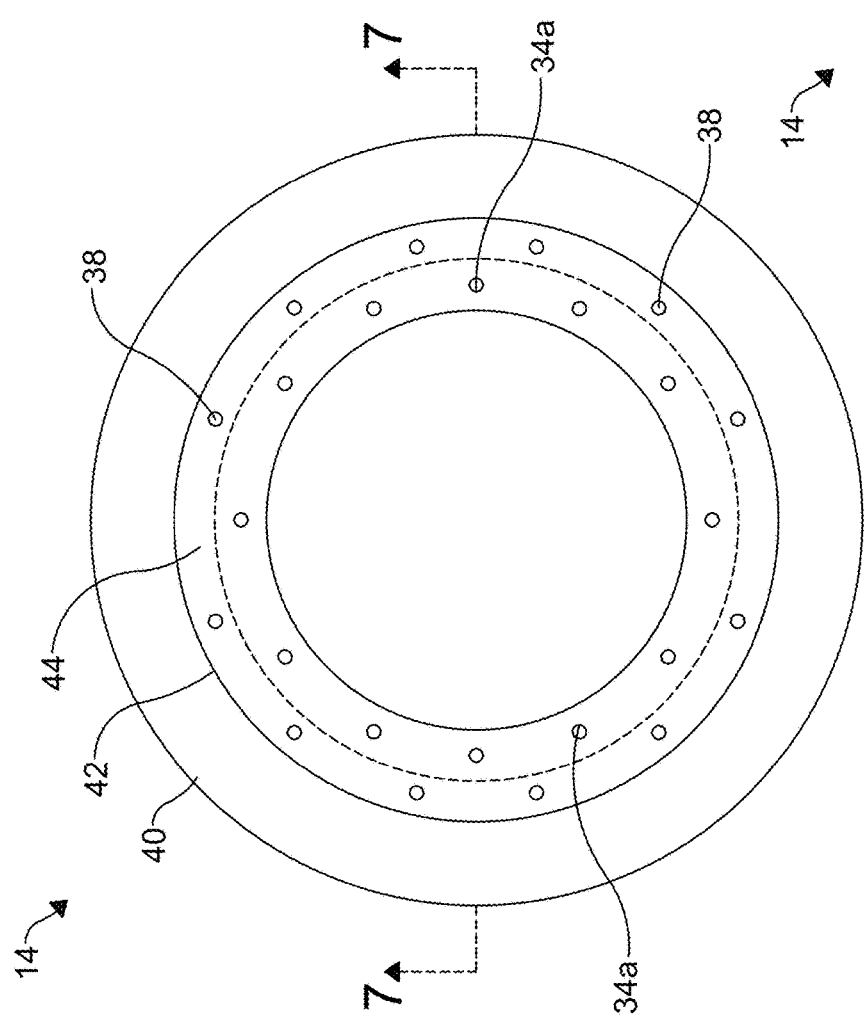

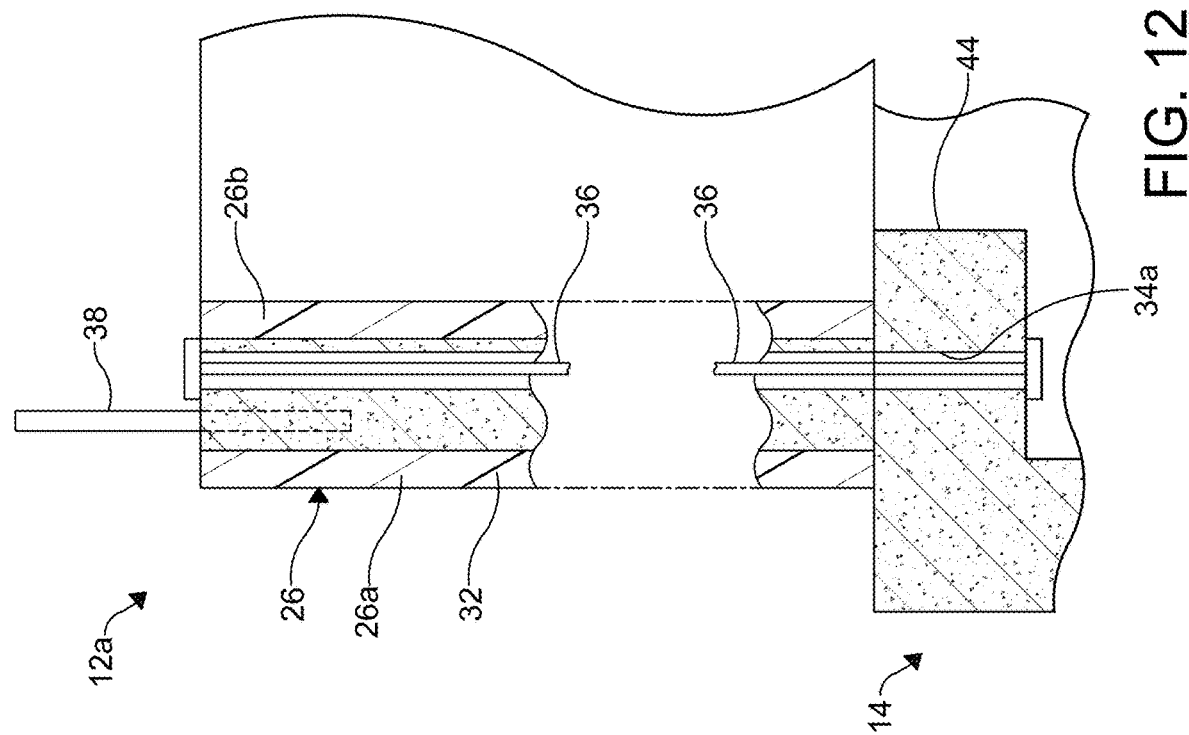
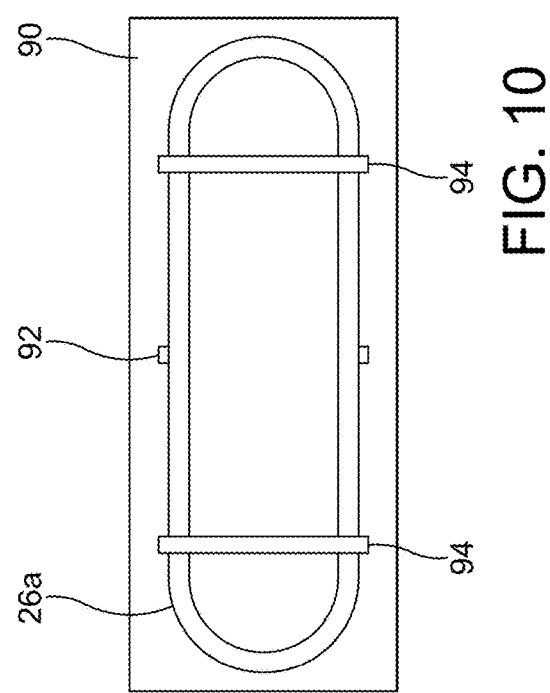

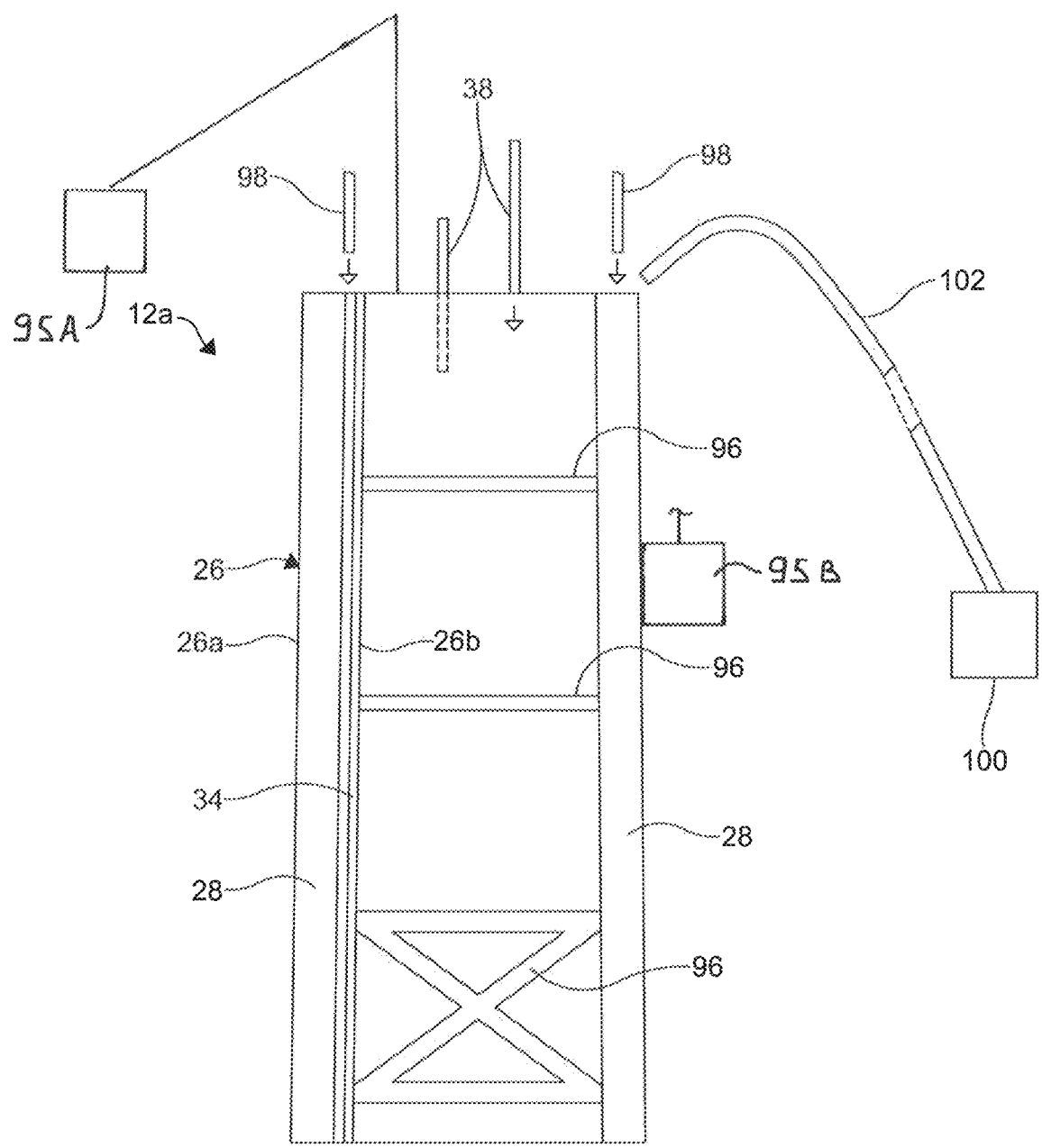
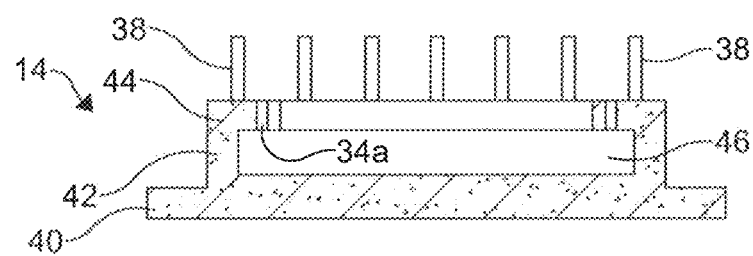
FIG. 11

HYBRID CONCRETE-COMPOSITE TOWER FOR A WIND TURBINE AND METHOD OF MANUFACTURING

CROSS REFERENCE TO RELATED APPLICATIONS

This application claims the benefit of U.S. Provisional Application No. 61/945,942 filed Feb. 28, 2014, the disclosure of which is incorporated herein by reference.

BACKGROUND OF THE INVENTION

This invention relates in general to wind turbine towers. In particular, this invention relates to an improved wind turbine tower having a hybrid concrete-composite construction and a method of manufacturing such a hybrid concrete-composite tower.

A variety of conventional wind turbine towers are known, and each has limitations, including the difficulty in erecting towers taller than about 80 m. Tubular steel towers for example, are also typically limited to diameters of about 4.6 m, so that they can be moved by truck. Although towers having hub heights greater than about 80 m have been built, such tall towers are expensive and very difficult to construct and erect using conventional construction methods. For example, the height, diameter, and weight of tubular steel tower sections required for towers taller than about 80 m, are not only difficult to manufacture, but very difficult or impossible to move from a manufacturing location to a tower construction site. Additionally, such tubular steel tower sections would be difficult or impossible to lift into place using conventional cranes at heights of 80 m and greater.

Other conventional types of wind turbine towers include space frame or lattice towers, also typically formed from steel, post-tensioned concrete towers, typically assembled from panels, and hybrid steel-concrete towers, although each has disadvantages. A lattice tower requires re-tightening of fasteners throughout its life, is very labor intensive to erect, creates an undesirable perch for birds, and is difficult to climb. The panels of a post-tensioned concrete tower are very heavy and require a heavy crane to erect. And the sections of a hybrid steel-concrete tower are labor intensive to cast or manufacture, and are also very heavy and require a heavy crane to erect.

Therefore, there remains a need to provide an improved wind turbine tower that is lightweight, durable, capable of being erected to heights greater than conventional wind turbine towers, and an improved method of manufacturing such a tower.

SUMMARY OF THE INVENTION

This invention relates to an improved wind turbine tower and a method of manufacturing such a tower. In one embodiment, the wind turbine tower includes a plurality of tower sections axially aligned and connected together. Each tower section includes an inner wall having a tapered cylindrical shape concentrically positioned within an outer wall having a tapered cylindrical shape. An annular space is defined between the inner wall and the outer wall, and a layer of concrete is disposed within the annular space. A plurality of post-tensioning cables extend longitudinally within the annular space or outside the outer wall, such that a first one of the tower sections is connected to a second one of the tower sections by a plurality of the post-tensioning cables.

A method of forming the improved wind turbine tower includes forming a foundation, forming a plurality of outer walls having a tapered cylindrical shape, forming a plurality of inner walls having a tapered cylindrical shape, and joining each inner wall within one of the outer walls to define a plurality of shells such that an annular space is defined between the inner wall and the outer wall of each shell, and each shell has a first end and a second end. The first end of a first one of the shells is mounted on the foundation. Elongated tubes defining cable channels are disposed longitudinally within the annular space. Wet concrete is introduced into the annular space of the first one of the shells. After the concrete is cured, a plurality of post-tensioning cables is extended through the elongated tubes and between the foundation and the second end of the first one of the shells. Tension is applied to the plurality of post-tensioning cables to connect the first one of the shells to the foundation.

Other advantages of the invention will become apparent to those skilled in the art from the following detailed description, when read in view of the accompanying drawings.

BRIEF DESCRIPTION OF THE DRAWINGS

FIG. 4 is an elevational view of the outside surface of the inner wall of the tower section illustrated in FIG. 3, showing shear transfer members formed thereon.

FIG. 5 is an elevational view in cross-section of the inside surface of the outer wall of the tower section illustrated in FIG. 3, showing shear transfer members formed thereon.

FIG. 6 is a plan view of the foundation illustrated in FIG. 1.

FIG. 7 is a cross-sectional view of the foundation taken along the line 7-7 of FIG. 6.

FIG. 10 is a plan view of an oblated wind tower section on a truck bed.

FIG. 11 is an elevational view, partially in cross-section, of the lower most tower section of the improved wind turbine tower illustrated in FIG. 1, shown during the manufacturing process.

FIG. 12 is an enlarged elevational view in cross-section of a portion of the lower most tower section illustrated in FIG. 11, shown in a completed form.

DETAILED DESCRIPTION OF THE INVENTION

Figure 1:
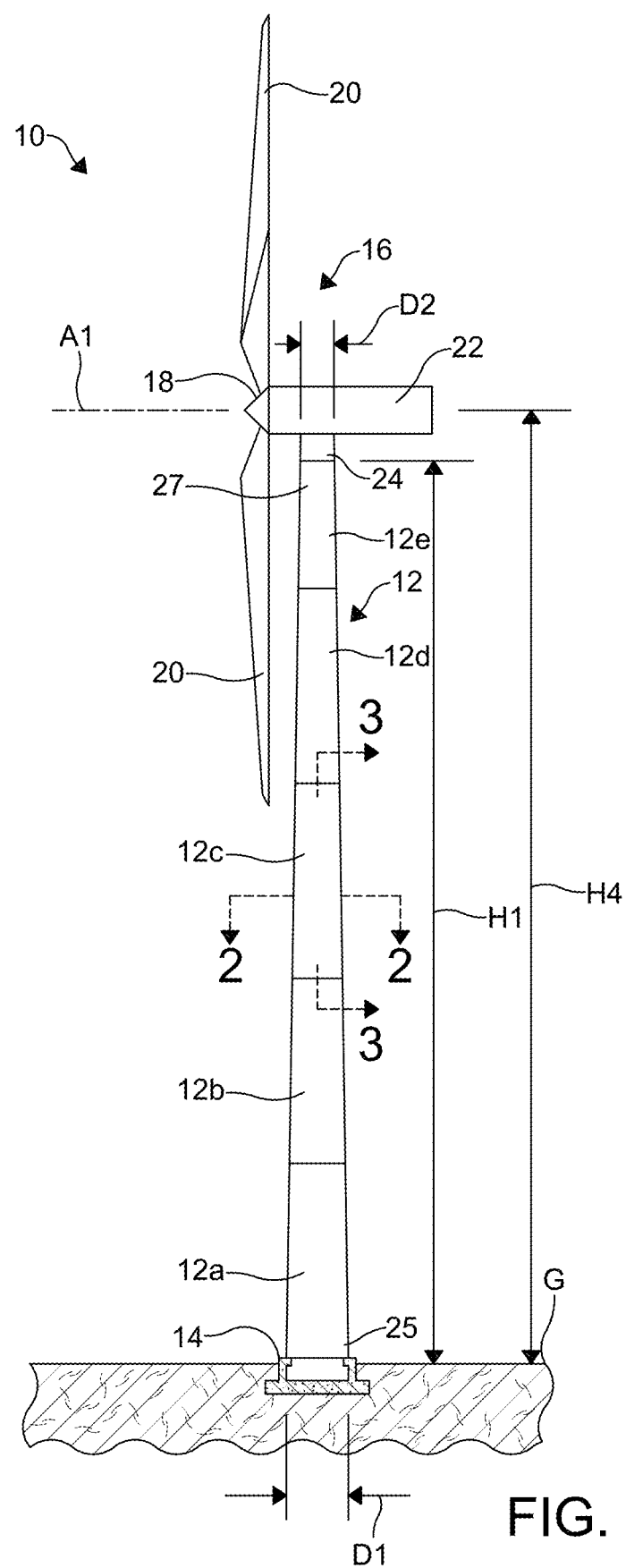
FIG. 1 is an elevational view, partially in cross-section, of a first embodiment of an improved wind turbine tower in accordance with this invention.

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

As used herein the term hub height is defined as the height of a wind turbine tower, such as the wind turbine tower 12, as measured from the ground G to center axis A1 of the hub 18.

Referring now to FIGS. 1 through 5, a first embodiment of an improved wind turbine tower is shown at 12. The wind turbine tower 12 is shown erected, attached to a foundation 14 constructed in the ground G, and supporting a wind turbine 16. The wind turbine tower 12 and the attached wind turbine 16 define a wind turbine tower assembly 10.

In the embodiments illustrated herein, the wind turbine 16 is a horizontal-axis wind turbine. Alternatively, the wind turbine 16 may be a vertical-axis wind turbine (not shown). The size of the wind turbine 16 will vary based the size and strength of the wind turbine tower 12, the wind conditions at the location where the wind turbine tower 12 is erected, and the desired power output. For example, the wind turbine 16 may have an output of about 5 MW. Alternatively, the wind turbine 16 may have an output within the range of from about 1 MW to about 10 MW.

The illustrated wind turbine 16 is conventional and includes a rotatable hub 18. At least one rotor blade 20 is coupled to and extends outward from the hub 18. The hub 18 is rotatably coupled to an electric generator (not shown). The electric generator may be coupled via a transformer (not shown) and to power cable (not shown), and to a power grid (not shown). In the illustrated embodiment, the hub 18 has three rotor blades 20. In other embodiments, the hub 18 may have more or less than three rotor blades 20. A nacelle 22 is attached to the wind turbine 16 opposite the hub 18. The nacelle 22 may be attached to the wind turbine tower 12 by an adaptor or connecter 24, such as a steel nacelle yaw bearing connector.

The wind turbine tower 12 has tapered cylindrical shape. The diameter of the wind turbine tower 12 tapers from a first diameter D1 at its base 25 to a second, smaller diameter D2 at its upper end 27. For example, the wind turbine tower 12 may have a first diameter D1 within the range of from about 3 m to about 15 m and a second diameter D2 also within the range of from about 3 m to about 15 m. It will be understood that the wind turbine tower 12 may also diameters D1 and D2 less than about 3 m or greater than about 15 m. It will be understood that the illustrated tapered cylindrical shape of the wind turbine tower 12 is not required, and the wind turbine tower 12 may have other shapes. For example, the wind turbine tower 12 may have no taper; i.e., the wind turbine tower 12 may be substantially cylindrical in shape. Additionally, the wind turbine tower 12 may also have a reverse taper such that the first diameter D1 is smaller than the second diameter D2; i.e., wherein the wind turbine tower 12 tapers from the second diameter D2 at its upper end 27 to the first, smaller diameter D1 at its base 25.

The wind turbine tower 12 may have any desired height H1, such as a height within the range of from about 117 m to about 197 m, thereby allowing the wind turbine tower assembly 10 to be constructed to a hub height H4 greater than the hub height of a conventional wind turbine tower; i.e., about 80 m. Significantly, the wind turbine tower assembly 10 may be constructed to a hub height H4 within the range of from about 120 m to about 200 m. It will be understood that the wind turbine tower assembly 10 may also have a hub height H4 less than about 120 m or greater than about 200 m.

As described in detail below, the wind turbine tower 12 may be formed from one or from multiple tower sections. In the illustrated embodiment, the wind turbine tower 12 is formed from five tower sections 12a-12e. The first four tower sections from the ground G up, 12a-12d, respectively, are about 30 m long. The fifth tower section 12e is about 27 m long. Alternatively, the tower sections 12a-12e may have any desired first and second diameters D1 and D2, and any desired length or lengths.

As shown in FIG. 1, each of the tower sections 12b-12e is smaller than the adjacent lower tower section. The first or base diameter of each tower section is equal to the second or upper diameter of the tower section upon which it is mounted.

Figure 2:
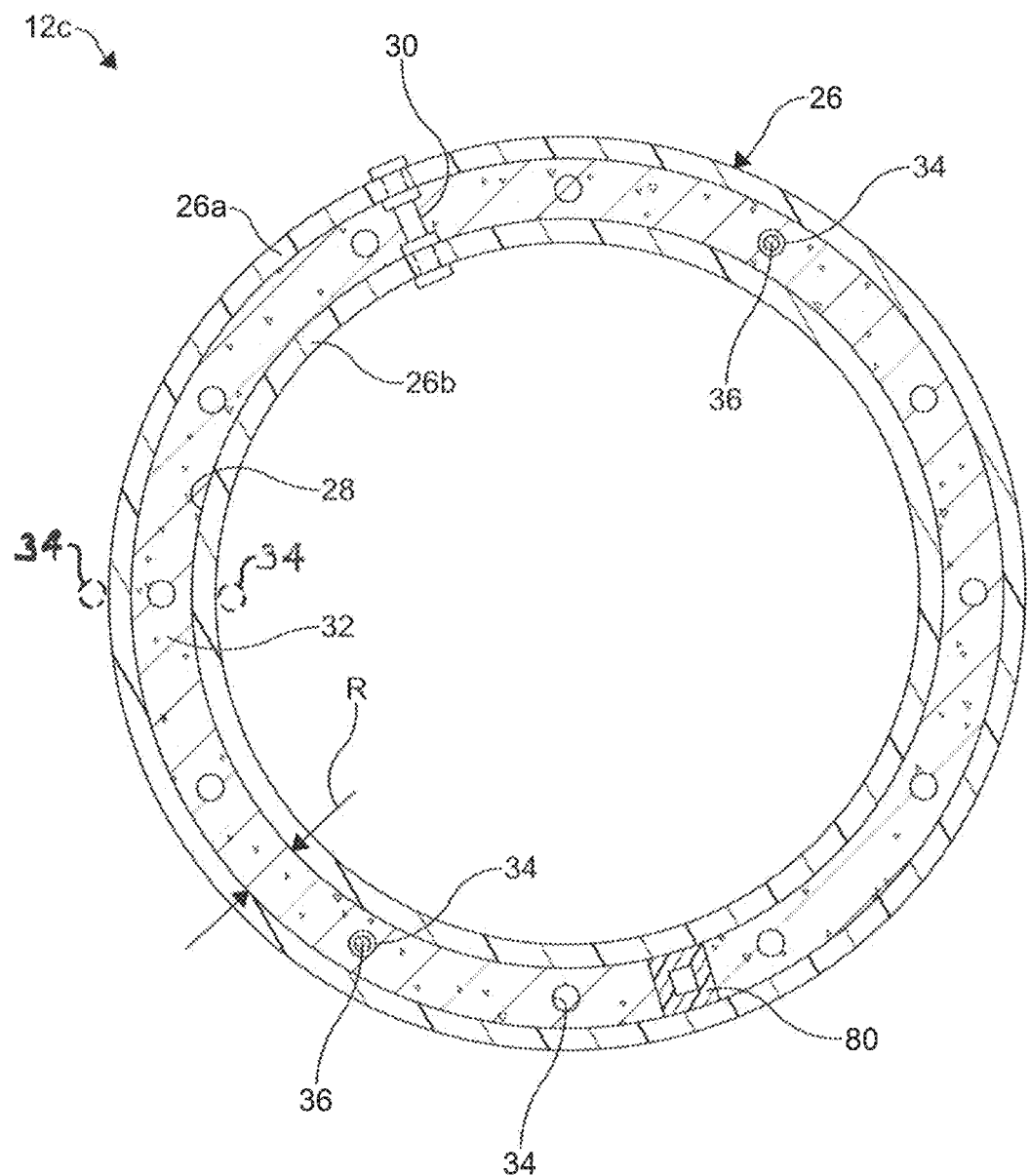
FIG. 2 is a cross-sectional view of a tower section taken along the line 2-2 of FIG. 1.
Figure 3:
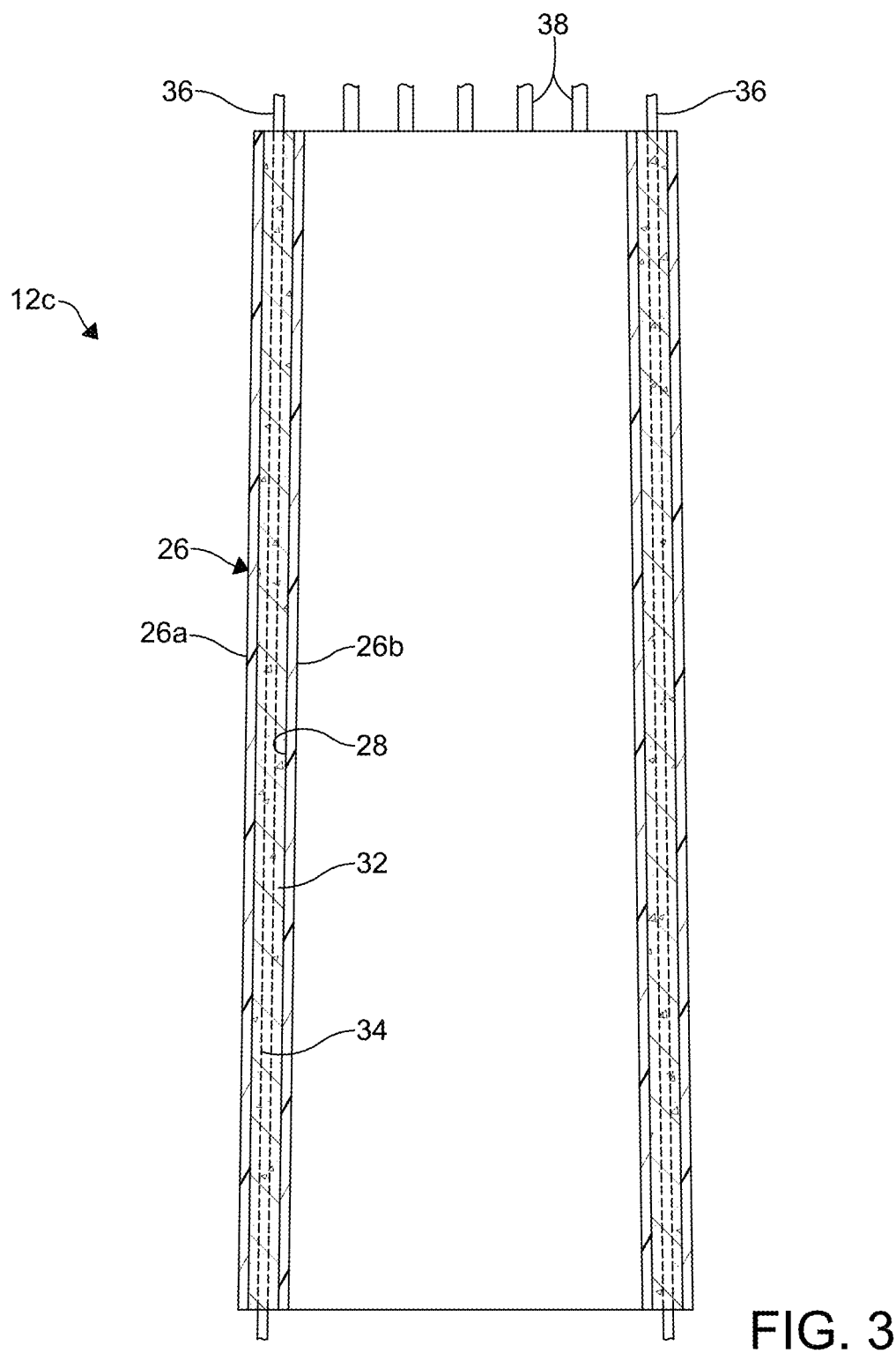
FIG. 3 is an alternate cross-sectional view of the tower section taken along the line 3-3 of FIG. 1.

As best shown in FIGS. 2 through 5, each tower section 12b-12e of the wind turbine tower 12 has tapered cylindrical shape and includes a two-layer wall or shell 26 formed from a composite material. The cross-sectional views in FIGS. 2 and 3 are taken though the tower section 12c. It will be understood however, that the other tower sections 12a, 12b, 12d, and 12e are identically constructed. The two-layer shell 26 includes a first skin or outer wall 26a and second skin or inner wall 26b. The inner wall 26b is smaller than, and concentrically positioned within, the outer wall 26a such that an annular space 28 is defined between an outside surface of the inner wall 26b and an inside surface of the outer wall 26a. The annular space 28 may have any desired width, i.e., the radial distance R between the outside surface of the inner wall 26b and the inside surface of the outer wall 26a. For example, the radial distance R may be any distance, such as within the range of from about 10 cm to about 30 cm. The outer and inner walls 26a and 26b, respectively, may be formed from any desired composite material, such as fiber reinforced polymer (FRP). It will be understood that the radial distance R may also be less than about 10 cm or greater than about 30 cm.

As described in detail below, the outer and inner walls 26a and 26b, are formed separately. The inner wall 26b is inserted into and concentrically positioned within the outer wall 26a. Fasteners, such as threaded fasteners 30, a representative one of which is shown in FIG. 2, may be used to join the inner wall 26b to the outer wall 26a and to ensure that the inner wall 26b is uniformly spaced from the outer wall 26a. When connected by a plurality of the fasteners 30, the outer and inner walls 26a and 26b define the shell 26.

Concrete 32 is disposed in the annular space 28. The concrete 32 includes a plurality of tubes 34 defining ducts or channels through which post-tensioning rods or cables 36 are extended.

The shell 26 functions as the formwork for rapid casting of the layer of concrete 32, as described in detail below. The shell 26 as functions as an exoskeleton after the layer of concrete 32 has been cured, thus eliminating the need for conventional rebar to reinforce the layer of concrete 32. With the shell 26 as a reinforcing exoskeleton, and without the need for rebar, there is no limit to the diameter at which the shell 26 may be formed. The tower sections 12a-12e, and the tower 12 formed therewith, require very little maintenance over the life of the tower, and do not require paint.

As an alternative to the fasteners 30, spacing members 80 may be positioned between inner wall 26b and the outer wall 26a. A representative one of such a spacing member 80 is shown in FIG. 2. The spacing member 80 extends between the outside surface of the inner wall 26b and the inside surface of the outer wall 26b to ensure that the inner wall 26b is uniformly spaced from the outer wall 26a. If desired, the spacing member 80 may be attached to one or both of the inner wall 26b and the outer wall 26a by any desired means, such as with adhesive or fasteners, such as threaded fasteners. In the illustrated embodiment, the spacing member 80 is formed from pultruded FRP and has a rectangular cross-sectional shape. Alternatively, the spacing member 80 may be formed from any desired material by any desired manufacturing method, and may have other shapes.

Referring to FIG. 3, a plurality of shear transfer studs 38, described below in detail, may extend longitudinally between adjacent tower sections 12a-12e, and between the foundation 14 and the first tower section 12a.

The foundation 14 is formed in the ground G at a location at which the wind turbine tower 12 will be erected, as shown in FIGS. 1, 6, and 7. The foundation 14 is formed from reinforced concrete that is cast in place. As shown in FIGS. 6 and 7, the foundation 14 includes an annular base 40. A substantially cylindrical foundation body 42 extends upwardly from the base 40 to a radially inwardly extending mounting flange 44. The mounting flange 44 defines a surface to which the lower most tower section 12a will be mounted.

In the illustrated embodiment, only the mounting flange 44 extends upwardly above ground level. Like the tower sections 12a-12e, the mounting flange 44 includes a plurality of channels 34a through which post-tensioning rods or cables 36 will extend. A plurality of the shear transfer studs 38 are embedded in the mounting flange 44 and extend outwardly (upwardly when viewing FIG. 7), and perpendicularly to an upper surface of the mounting flange 44.

The foundation body 42 may have a height H2 within the range of from about 1.2 m to about 3.5 m. It will be understood that the height H2 of the foundation body 42 may also be less than about 1.2 m or greater than about 3.5 m.

The space defined by the foundation body 42 between the base 40 and the mounting flange 44 defines an access space or pit 46, and provides access to the channels 34a and terminal ends of the post-tensioning cables 36 that extend therethrough. The access pit 46 is large enough to locate and operate jacking equipment, and large enough for a person to enter and perform maintenance and repair functions, such as inspect and monitor the structural health of the foundation 14, the channels 34a, the cables 36, the wind turbine tower 12, and to adjust the tension of the cables 36 as required.

Figure 8:
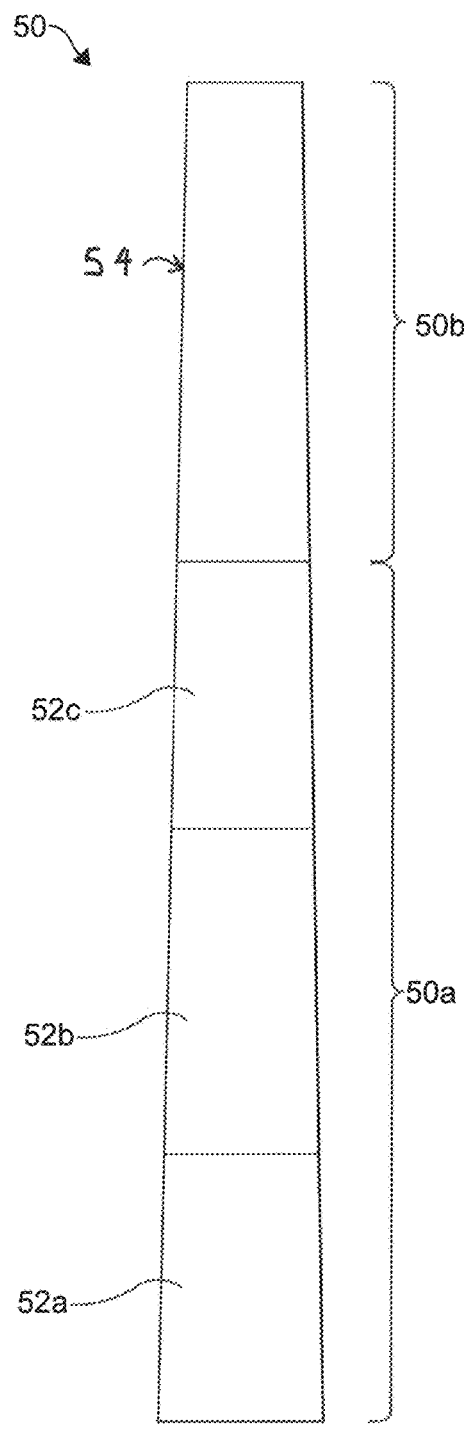
FIG. 8 is an elevational view of a second embodiment of the improved wind turbine tower in accordance with this invention.

Referring now to FIG. 8, a second embodiment of the improved wind turbine tower is shown at 50. The wind turbine tower 50 is similar to the wind turbine tower 12, is attached to the foundation, and supports the wind turbine 16. The size of the wind turbine tower 50 and its component parts may be the same as described above for the wind turbine tower 12.

The illustrated wind turbine tower 50 includes a first or lower portion 50a and a second or upper portion 50b. The lower portion 50a comprises about ⅔ of the total height of the wind turbine tower 50 and the upper portion 50b comprises about ⅓ of the total height of the wind turbine tower 50. Alternatively, the lower portion 50a may comprise more or less than about ⅔ of the height of the wind turbine tower 50 and the upper portion 50b may comprise more or less than about ⅓ of the height of the wind turbine tower 50.

The lower portion 50a may be formed from tower sections 52a, 52b, and 52c, similar to the tower sections 12a-12e. Although the illustrated lower portion 50a has three tower sections 52a, 52b, and 52c, it will be understood that the lower portion 50a may be constructed from one tower section or more than three tower sections.

To reduce its weight, the upper portion 50b may be formed from a tower section shell 54. The tower section shell 54 is similar to the tower section shells 26 and includes the annular space 28. When the tower section shells 26 or 54 are used in a tower 12/50 without the concrete 32, the annular space 28 may be filled with a lightweight fill material, such as polymer foam or wood. A plurality of channels (not shown) may be formed in the polymer foam or wood fill material through which the post-tensioning cables 36 may extend. If the tower section shell 54 is used without such fill material in the annular space 28, it will be understood that suitable guide members (not shown) may be mounted within the annular space 28 to position and guide the post-tensioning cables 36 therein. Although only one tower section shell 54 is shown in the illustrated embodiment of the wind turbine tower 50, it will be understood that the upper portion 50b may be formed from two or more tower section shells 54. Alternatively, the upper portion 50b may be formed form a tower section (not shown), similar to tower section shell 54, but having only one wall. In such a tower section, the channels, such as defined by the rigid tubes 34 described below, extend along, and are attached to, an inside surface of the tower sections having only one wall.

Figure 9:
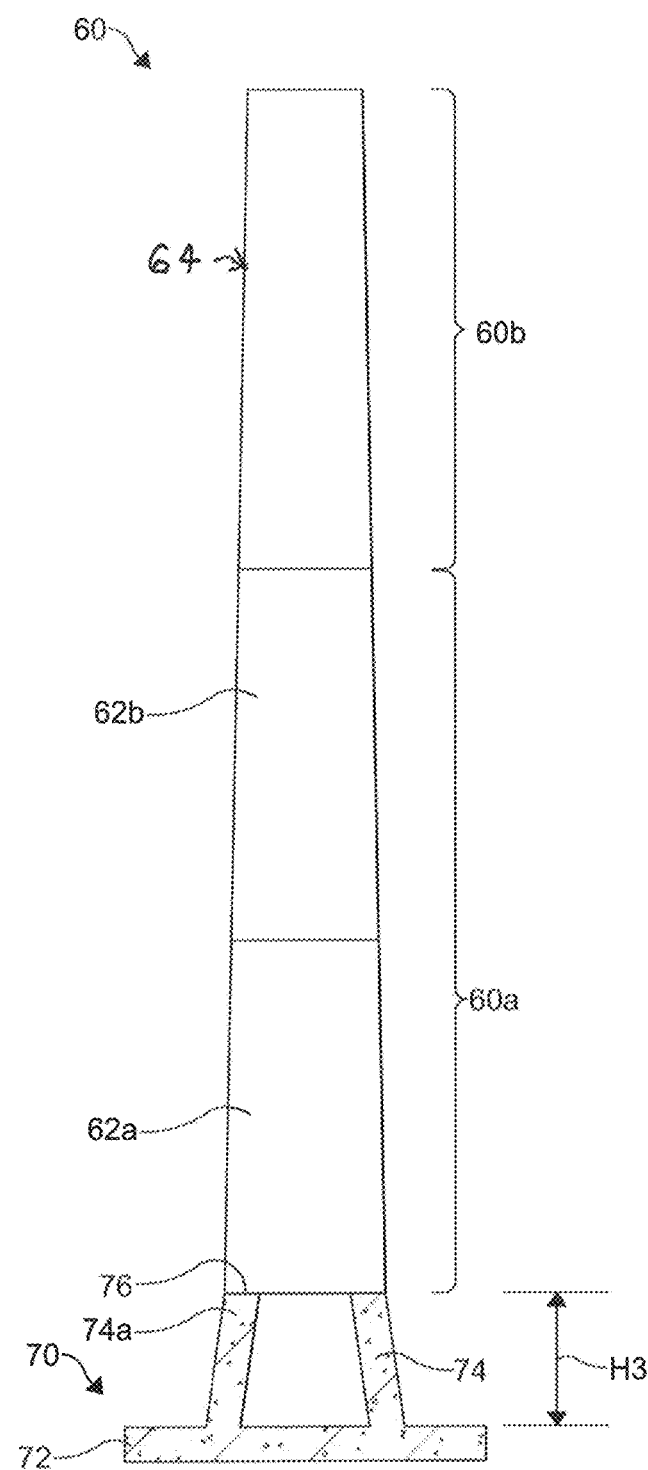
FIG. 9 is an elevational view of a third embodiment of the improved wind turbine tower in accordance with this invention.

Referring now to FIG. 9, a third embodiment of the improved wind turbine tower is shown at 60. The tower 60 is similar to the wind turbine tower 50 and supports the wind turbine 16. The size of the tower 60 and its component parts may be the same as described above for the towers 12 and 50.

The illustrated tower 60 includes a first or lower portion 60a, a second or upper portion 60b, but differs from the wind turbine tower 50 at its base. As shown in FIG. 9, a second embodiment of the foundation 70 may be provided. The foundation 70 is similar to the foundation 14, is formed from reinforced concrete that is cast in place, and includes an annular base 72. The foundation body 74 is tapered and extends upwardly from the base 72. The foundation body 74 tapers from a first, larger diameter at the annular base 72 to a second, smaller diameter at its upper end 74a. An upper surface 76 of the foundation body 74 defines a mounting surface to which the lower most tower section of the lower portion 60a will be mounted. An interior of the foundation body 74 defines an access pit 78.

The lower portion 60a may be formed from tower sections 62a and 62b, similar to the tower sections 52a, 52b, and 52c. Although the illustrated lower portion 60a has only two tower sections 62a and 62b, it will be understood that the lower portion 60a may be constructed from one tower section or more than two tower sections. To reduce its weight, the upper portion 60b may be formed from one or more tower section shells 64, which may be identical to the tower section shell 54 of the wind turbine tower 50.

The foundation body 74 may have a height H3 within the range of from about 3 m to about 15 m. It will be understood that the height H3 of the foundation body 74 may also be less than about 3 m or greater than about 15 m. By forming the foundation body 74 at the height H3, the lower most tower section 62a of the lower portion 60a will be much lighter than the lower most tower section 52a of the wind turbine tower 50 in FIG. 8.

Alternatively, the tower 60 may be erected on the foundation 14, but include a lower tower section, similar to the lower section 50a, but formed precast reinforced concrete.

A method of manufacturing the wind turbine tower 12 will now be described. In a first step of the method of manufacturing the wind turbine tower 12, the foundation 14, as shown in FIGS. 1, 6, and 7 and described above, is formed from reinforced concrete that is cast in place using conventional formwork (not shown).

In a second step of the method of manufacturing the wind turbine tower 12, the outer walls 26a and the inner walls 26b of each tower section 12b-12e are formed and joined together with the fasteners 30 to define the shells 26 shown in FIGS. 2 through 5. The second step of the method of manufacturing the wind turbine tower 12 may be performed before, during, or after the completion of the first step wherein the foundation 14 is formed.

The outer walls 26a and the inner walls 26b may be formed from FRP in situ using any desired method. One suitable method of forming the outer walls 26a and the inner walls 26b is a field circumferential winding manufacturing process, such as described at the Ershings Corporation web site: http://www.ershigs.com. Once formed, each inner wall 26b is concentrically position within its corresponding outer wall 26a and the walls 26a and 26b are joined together with the fasteners 30 to define the shells 26. It will be understood that the walls 26a and 26b may be formed in very large sizes, including having diameters of 30 m or larger, and lengths of 60 m or longer.

Shear transfer members may be formed on one or both of an outside surface of the inner wall 26b, as shown in FIG. 4, and an inside surface of the outer wall 26a, as shown in FIG. 5. As shown, the shear transfer members may be one or both of ribs or ridges 82 and grooves 84 formed on the outside surface of the inner wall 26b. The shear transfer members may also be one or both of ribs or ridges 86 and grooves 88 formed on the inside surface of the outer wall 26a. These shear transfer members promote shear transfer between the concrete 32 and each of the inner wall 26b and the outer wall 26a, and eliminate the need for conventional steel rebar reinforcement in the concrete 32, thereby reducing weight and cost.

In the illustrated embodiments, the ridges 82 and 86, and the grooves 84 and 88, are shown substantially perpendicular to an axis A2 of the inner wall 26b and the outer wall 26a. Alternatively, the ridges 82 and 86, and/or the grooves 84 and 88 may be configured in a repeating pattern or irregular array of any desired geometric shape or combination of shapes (not shown), for example, a repeating hexagonal pattern (not shown).

The outer walls 26a and the inner walls 26b may also be formed at a manufacturing site remote from the site where the wind turbine tower 12 will be erected. Such remotely formed outer walls 26a and inner walls 26b may transported to the site where the wind turbine tower 12 will be erected. To transport outer and inner walls 26a and 26b, represented by the outer wall 26a in FIG. 10, that may have diameters within the range of from about 3 m to about 15 m or larger, the outer wall 26a may oblated; i.e., flattened into an oblate having an ellipsoid cross-sectional shape, so that it can fit on a truck bed 90. The oblated outer wall 26a may be secured to the truck bed 90 in its oblated state by any means, such as with stakes 92 and/or straps 94. It will be understood that the process of temporarily oblating the outer wall 26a during transport will not damage the outer wall 26a, and that the outer wall 26a will return to its cylindrical shape when the stakes 92 and/or the straps 94 are removed. Thus, by flattening the large diameter outer wall 26a into an oblate shape, it can fit on the truck bed 90 and be safely transported to the site where the wind turbine tower 12 will be erected.

In a third step of the method of manufacturing the wind turbine tower 12, the shell 26 defining the lower most tower section 12a will be positioned onto the foundation 14, as shown in FIG. 11. As shown, the tower section 12a is positioned, such as with a crane (schematically illustrated at 95A in FIG. 11), on the flange 44 such that the shear transfer studs 38 extend into the annular space 28. Any suitable crane may be used. Advantageously, the relatively light weight tower sections 12a-12e may be lifted and positioned with a self-erecting tower-mounted crane (schematically illustrated at 95B in FIG. 11). Because the tower sections 12a-12e do not yet include the layer of concrete 32, they are relatively light weight, and a heavy crane is not needed to lift and position the tower sections 12a-12e.

The inside of the tower section 12a may be braced with temporary bracing or shoring material, such as shown at 96 in FIG. 11. The shoring material 96 may be any suitable shoring material, such as wood. If desired, the shoring material 96 may be expandable. Additionally or alternatively, the tower section 12a may be braced and temporarily attached to the foundation 14 by a plurality of temporary tension rods 98 disposed within the annular space 28.

Rigid tubes 34, such as steel tubes may be disposed within the annular space 28 to define the channels through which the post-tensioning cables 36 the temporary tension rods 98 will extend. The rigid tubes 34 that define the channels may be attached to both the inner wall 26b and the outer wall 26a, therefore attaching the inner wall 26b to the outer wall 26a. Alternatively, the rigid tubes 34 that define the channels may be mounted to the outside surface of the outer wall 26a prior to, or after positioning the tower section 12a on the foundation 14. Also, the rigid tubes 34 that define the channels may be mounted to the inside surface of the inner wall 26b.

A plurality of the shear transfer studs 38 are positioned in the annular space 28 at an upper end of the tower section 12a, such that a portion of the studs 38 will be cast into the concrete 32 that will be subsequently deposited in the annular space 28.

In a fourth step of the method of manufacturing the wind turbine tower 12, wet concrete is deposited in the annular space 28, such as by pumping. As shown in FIG. 11, wet concrete can be pumped from a source of concrete, schematically illustrated at 100, via a hose 102 to the annular space 28 until the annular space 28 is full of wet concrete. The wet concrete is allowed to cure, there by defining the layer of concrete 32.

When the layer of concrete 32 in the lower most tower section 12a is cured, as best shown in FIG. 12, a plurality of the post-tensioning cables 36, such as two or more post-tensioning cables 36, are extended through some of the channels 34 between an upper end of the tower section 12a and the flange 44 of the foundation 14. Tension is then applied to the cables 36, thus applying a compressive force between the foundation 14 and the tower section 12a.

Once the layer of concrete 32 is cured, the third step of the method of manufacturing the wind turbine tower 12 will be repeated for each of the remaining tower sections, such as the tower sections 12b-12e. If desired, sealant (not shown) may be applied between the foundation 14 and the tower section 12a, and between adjacent tower sections 12b-12e.

When the layer of concrete 32 in each of the tower sections 12b-12e is cured, a plurality of the post-tensioning cables 36, such as two or more post-tensioning cables 36, are extended through some of the channels 34 between an upper end of the cured tower section 12b-12e and the flange 44 of the foundation 14, and further through each of the tower sections between the foundation 14 and the tower section just completed. Tension is then applied to the cables 36, thus applying a compressive force between the foundation 14 and the tower section 12a.

After the portion of the post-tensioning cables 36 are extended through the channels 34 of each tower section 12a-12e, any temporary tension rods 98 used therein may be removed. Additionally, the shoring material 96 may be removed.

Likewise, when the layer of concrete 32 in the upper most tower section 12e is cured, a portion of the post-tensioning cables 36 are extended through the remaining open channels 34 between flange 44 of the foundation 14 and an upper end of the tower section 12e. Tension is then applied to the cables 36, thus applying a compressive force between the foundation 14 and the tower section 12e, and completing the post-tensioning of the wind turbine tower 12.

The connector 24 may then be attached to the wind turbine tower 12, and the wind turbine 16, including the hub 18, the rotor blades 20, and the nacelle 22, may be attached to the connector 24. If desired, the rotor blades 20 may be formed in sections, thereby making them easier to lift and position. The connector 24 and the components of the wind turbine 16 may also be lifted and positioned by the self-erecting tower mounted crane described above.

A method of manufacturing the wind turbine tower 50 will now be described. The lower portion 50a of the wind turbine tower 50 may be formed in the same manner as the wind turbine tower 12, described above. Once the tower sections 52a, 52b, and 52c of the lower portion 50a are formed, thus defining the lower portion 50a, the tower section shell 54 may be positioned on the completed lower portion 50a and post-tensioned as described above. The connector 24 and the wind turbine 16 may then be attached to the wind turbine tower 50 as described above.

A method of manufacturing the wind turbine tower 60 will now be described. In a first step of the method of manufacturing the wind turbine tower 60, the foundation 70, shown in FIG. 9 and described above, is formed from reinforced concrete that is cast in place using conventional formwork (not shown) in the same manner as the foundation 14. The lower portion 60a of the wind turbine tower 60 may be formed in the same manner as the lower portion 50a of the wind turbine tower 50, described above and mounted to foundation 70. Once the tower sections 62a, 62b, and 62c of the lower portion 60a are formed, thus defining the lower portion 60a, the tower section shell 64 may be positioned on the completed lower portion 60a and post-tensioned as described above. The connector 24 and the wind turbine 16 may then be attached to the wind turbine tower 60 as described above.

The embodiments of the methods of manufacturing the wind turbine towers 12, 50, and 60 described herein provide advantages over conventional methods of manufacture conventional wind turbine towers, and provide for a reduction of Levelized Cost of Energy (LCOE). Such advantages include eliminating the limitations of over the road transportation of the very large tower sections 12a-12e, because the tower sections 12a-12e may be formed in situ, or formed remotely, flattened into an oblate shape, and transported on a truck bed. The need for heavy lift cranes is eliminated because the tower sections 12a-12e are first lifted and positioned while in the form of the relatively light weight shell 26. Further, the relatively light weight tower sections 12a-12e may be lifted and positioned with the self-erecting tower mounted crane described above. The wind turbine towers 12, 50, and 60 are very low maintenance, and have a longer life than convention al steel towers. The use of the combination of the shear transfer studs 38 and the post-tensioning cables 36 eliminates the requirement for bolts used in conventional wind turbine towers, and the required periodic torquing and maintenance of such bolts. Because the outer walls 26a and the inner walls 26b may be formed from FRP in situ, jobs may be created at the sites where the wind turbine towers 12, 50, and 60 will be erected. Also, composite material used to form the shell 26 is superior to steel in its ability to dampen vibrations, and it has been shown that wind turbine towers constructed as described above in the descriptions of the wind turbine towers 12, 50, and 60, have excellent dynamic structural damping properties.

The principle and mode of operation of the invention have been described in its preferred embodiments. However, it should be noted that the invention described herein may be practiced otherwise than as specifically illustrated and described without departing from its scope.

What is claimed is:

1. A wind turbine tower comprising:
   a plurality of tower sections axially aligned and connected together;
   each tower section including an inner wall having a tapered cylindrical shape concentrically positioned within an outer wall having a tapered cylindrical shape and defining an annular space between the inner wall and the outer wall, and a layer of concrete within the annular space;
   shear transfer members formed on one of a longitudinally extending inside surface of the outer wall and a longitudinally extending outside surface of the inner wall, wherein the shear transfer members are one of circumferentially extending ridges and circumferentially extending grooves; and
   a plurality of post-tensioning cables;
   wherein a third one of the tower sections includes an inner wall having a tapered cylindrical shape concentrically positioned within and attached to an outer wall having a tapered cylindrical shape and defining an annular space between the inner wall and the outer wall, the third one of the tower sections having no fill material within the annular space;
   wherein the post-tensioning cables extend longitudinally one of within the annular space and outside the outer wall, such that a first one of the tower sections is connected to a second one of the tower sections by a plurality of the post-tensioning cables; and
   wherein the third one of the tower sections is connected to the first and second ones of the tower sections by the plurality of the post-tensioning cables.

2. The wind turbine tower according to claim 1, further including a foundation formed in the ground, wherein the first one of the tower sections is positioned on the foundation, the third one of the tower sections is connected to the second one of the tower sections, and the plurality of the post-tensioning cables connect the foundation, and the first, second, and third tower sections together.

3. The wind turbine tower according to claim 2, wherein the foundation is formed from reinforced concrete and includes a base, a substantially cylindrical body extending outwardly from the base and defining an access space therein, and a radially inwardly extending mounting flange formed in the body, the mounting flange defining a surface to which the first one of the tower sections is mounted.

4. A method of forming a wind turbine tower, characterized in that:
   forming a foundation;
   forming a plurality of outer walls having a tapered cylindrical shape;
   forming a plurality of inner walls having a tapered cylindrical shape;

joining each inner wall within one of the outer walls with a plurality of fasteners to define a plurality of shells such that an annular space is defined between the inner wall and the outer wall of each shell, each shell having a first end and a second end;

mounting the first end of a first one of the shells on the foundation;

disposing elongated tubes defining cable channels longitudinally within the annular space;

introducing wet concrete into the annular space of the first one of the shells;

after the concrete is cured, extending a plurality of post-tensioning cables through the elongated tubes and between the foundation and the second end of the first one of the shells and applying tension to the plurality of post-tensioning cables to connect the first one of the shells to the foundation;

mounting the first end of a second one of the shells to the second end of the first one of the shells;

disposing elongated tubes defining cable channels longitudinally within the annular space of the second one of the shells;

introducing wet concrete into the annular space of the second one of the shells;

after the concrete in the annular space of the second one of the shells is cured, extending a plurality of post-tensioning cables through the elongated tubes and between the foundation and the second end of the second one of the shells and applying tension to the plurality of post-tensioning cables to connect the second one of the shells to the first one of the shells and to the foundation;

mounting the first end of a third one of the shells to the second end of the second one of the shells, the third one of the shells having no fill material within the annular space;

disposing elongated tubes defining cable channels longitudinally within the annular space of the third one of the shells; and extending a plurality of post-tensioning cables between the foundation and the second end of the third one of the shells and applying tension to the plurality of post-tensioning cables to connect the third one of the shells to the first and second ones of the shells and to the foundation.

5. The method of forming a wind turbine tower according to claim 4, further including shear transfer members formed on one of a longitudinally extending inside surface of each outer wall and a longitudinally extending outside surface of each inner wall.

6. The method of forming a wind turbine tower according to claim 4, further including mounting a wind turbine to the second end of the third one of the shells.

7. The method of forming a wind turbine tower according to claim 4, further including:
forming the plurality of outer walls and the plurality of inner walls a location remote from a location where the foundation is formed;
flattening the outer walls and the inner walls into an oblate shape;
positioning a one of the outer walls and the inner walls that have been flattened into an oblate shape on truck bed;
moving the truck bed and the one of the outer walls and the inner walls that has been flattened into an oblate shape positioned thereon to the location where the foundation is formed.

8. The method of forming a wind turbine tower according to claim 4, wherein the foundation is formed from reinforced concrete and includes a base, a substantially cylindrical body extending outwardly from the base and defining an access space therein, and a radially inwardly extending mounting flange formed in the body, the mounting flange defining a surface to which the first one of the tower sections is mounted.

9. The method of forming a wind turbine tower according to claim 8, wherein the substantially cylindrical body extends longitudinally outward of the foundation such that it defines a lower tower section of the wind turbine tower.

10. The method of forming a wind turbine tower according to claim 4, wherein prior to the step of introducing wet concrete into the annular space of the first one of the shells, further including inserting temporary post-tensioning rods within the elongated tubes to temporarily secure the first one of the shells to the foundation.

11. The method of forming a wind turbine tower according to claim 4, wherein prior to the step of introducing wet concrete into the annular space of the second one of the shells, further including inserting temporary post-tensioning rods within the elongated tubes to temporarily secure the second one of the shells to the first one of the shells.

12. The method of forming a wind turbine tower according to claim 4, further including forming the plurality of outer tubes and inner tubes from fiber reinforced polymer in a field winding manufacturing process at a location where the wind turbine tower will be formed and erected.

13. The method of forming a wind turbine tower according to claim 4, further including a self-erecting tower-mounted crane mounted to the first one of the shells; and further including lifting and positioning the second one of the shells onto the first one of the shells with the self-erecting tower-mounted crane.

14. A method of assembling a wind turbine tower characterized in that:
forming a foundation;
forming a plurality of outer walls having a tapered cylindrical shape and further including shear transfer members formed on a longitudinally extending inside surface thereof;
forming a plurality of inner walls having a tapered cylindrical shape and further including shear transfer members formed on a longitudinally extending outside surface thereof;
wherein the shear transfer members are one of circumferentially extending ridges and circumferentially extending grooves;
concentrically positioning and joining each inner wall within one of the outer walls to define a plurality of shells such that an annular space is defined between the inner wall and the outer wall of each shell, each shell having a first end and a second end;
mounting the first end of a first one of the shells on the foundation;
disposing elongated tubes defining cable channels longitudinally within the annular space;
inserting temporary post-tensioning rods within the elongated tubes to temporarily secure the first one of the shells to the foundation;
introducing wet concrete into the annular space of the first one of the shells;
after the concrete is cured, extending a plurality of post-tensioning cables through the elongated tubes and between the foundation and the second end of the first one of the shells and applying tension to the plurality of post-tensioning cables to connect the first one of the shells to the foundation;

mounting the first end of a second one of the shells to the second end of the first one of the shells;

disposing the elongated tubes defining cable channels longitudinally within the annular space of the second one of the shells;

inserting the temporary post-tensioning rods within the elongated tubes to temporarily secure the second one of the shells to the first one of the shells;

introducing wet concrete into the annular space of the second one of the shells;

after the concrete in the annular space of the second one of the shells is cured, extending a plurality of post-tensioning cables through the elongated tubes and between the foundation and the second end of the second one of the shells and applying tension to the plurality of post-tensioning cables to connect the second one of the shells to the first one of the shells and to the foundation;

mounting the first end of a third one of the shells to the second end of the second one of the shells, the third one of the shells having no fill material within the annular space;

disposing elongated tubes defining cable channels longitudinally within the annular space of the third one of the shells; and extending a plurality of post-tensioning cables between the foundation and the second end of the third one of the shells and applying tension to the plurality of post-tensioning cables to connect the third one of the shells to the first and second ones of the shells and to the foundation.

15. The wind turbine tower according to claim 1, further including longitudinally extending tubes defining channels through which the post-tensioning cables extend, wherein the tubes extend one of on an outside surface of the tower section, on an inside surface of the tower section, and through the annular space.

16. The wind turbine tower according to claim 15, wherein the tubes extend though the annular space and are attached to both the inner wall and to the outer wall, therefore attaching the inner wall to the outer wall.

17. The method of forming a wind turbine tower according to claim 4, further including:
forming a second shell that has only one wall;
mounting a first end of the second shell to the second end of the first one of the shells;
disposing elongated tubes defining cable channels longitudinally on an inside surface of the second shell; and
applying tension to the plurality of post-tensioning cables to connect the second shell to the first one of the shells and to the foundation.

18. The method of forming a wind turbine tower according to claim 4, wherein the step of joining each inner wall within one of the outer walls includes attaching the elongated tubes in the annular space to both the inner wall and to the outer wall, thereby joining the inner wall to the outer wall.

* * * * *